United States Patent [19]

Carlson

[11] 4,071,043

[45] Jan. 31, 1978

[54] APPARATUS FOR PROTECTING A WATER FAUCET OR THE LIKE FROM FREEZING TEMPERATURES

[76] Inventor: Cleo D. Carlson, P.O. Box 147, Lake Jackson, Tex. 77566

[21] Appl. No.: 693,090

[22] Filed: June 4, 1976

[51] Int. Cl.² .............................................. F16K 51/00
[52] U.S. Cl. ................................... 137/375; 206/523; 264/321; 285/47
[58] Field of Search ................ 137/375; 206/523, 524; 264/321; 285/47, DIG. 5

[56] References Cited

U.S. PATENT DOCUMENTS

| | | | |
|---|---|---|---|
| 1,108,840 | 8/1914 | Franke | 137/375 X |
| 2,650,180 | 8/1953 | Walker | 137/375 |
| 3,367,358 | 2/1968 | Rentschler | 137/375 X |
| 3,402,731 | 9/1968 | Martin | 137/375 |
| 3,435,946 | 4/1969 | Sobek et al. | 206/523 |
| 3,556,158 | 1/1971 | Schneider | 285/47 X |
| 3,858,632 | 1/1975 | Stout | 137/375 X |

Primary Examiner—Robert G. Nilson

[57] ABSTRACT

There is disclosed apparatus comprising a pair of bodies of foamed plastic material having inner sides disposable on opposite sides of a water faucet or the like, and means for forcing the bodies toward one another, when so disposed, in order to cause the inner sides to be deformed into conformity with the faucet and to be tightly engaged with one another in surrounding relation to the faucet adjacent the wall from which it extends, the forcing means serving to hold the inner sides of the bodies in such tight engagement until released to permit removal of the bodies from the faucet.

3 Claims, 6 Drawing Figures

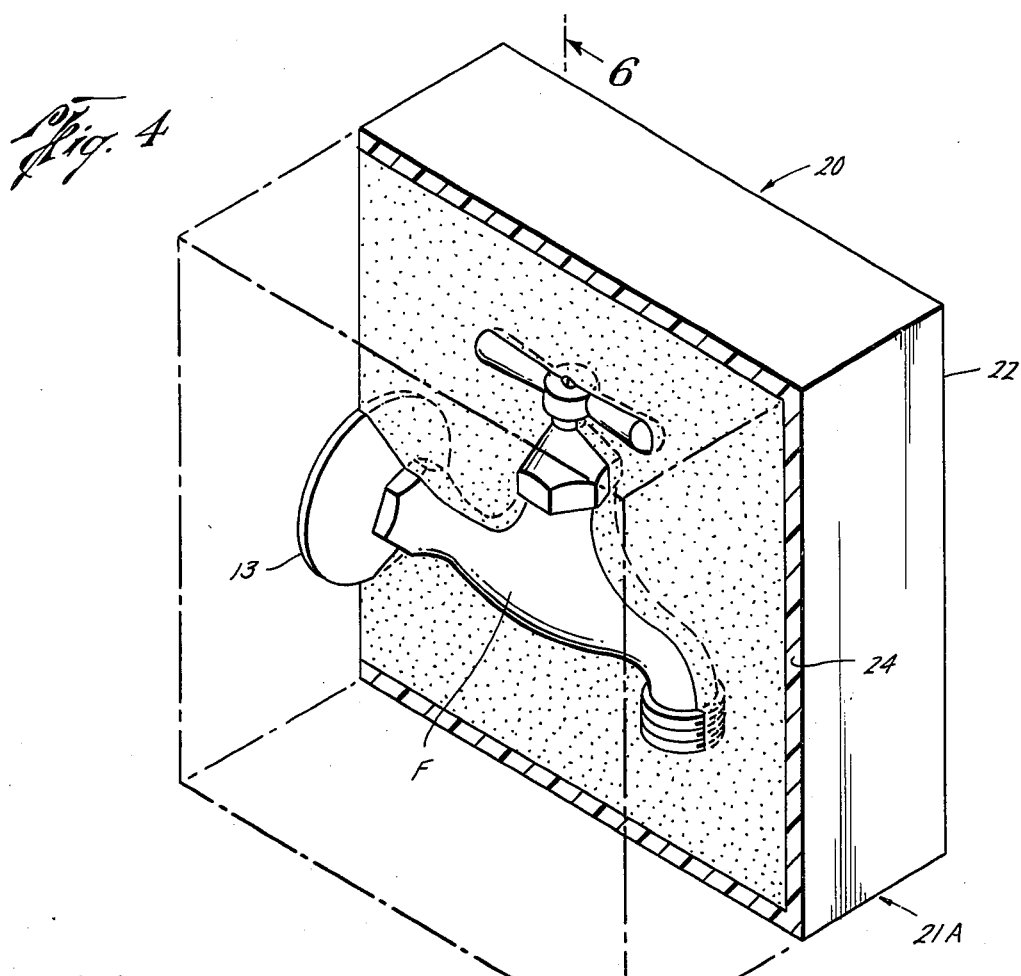
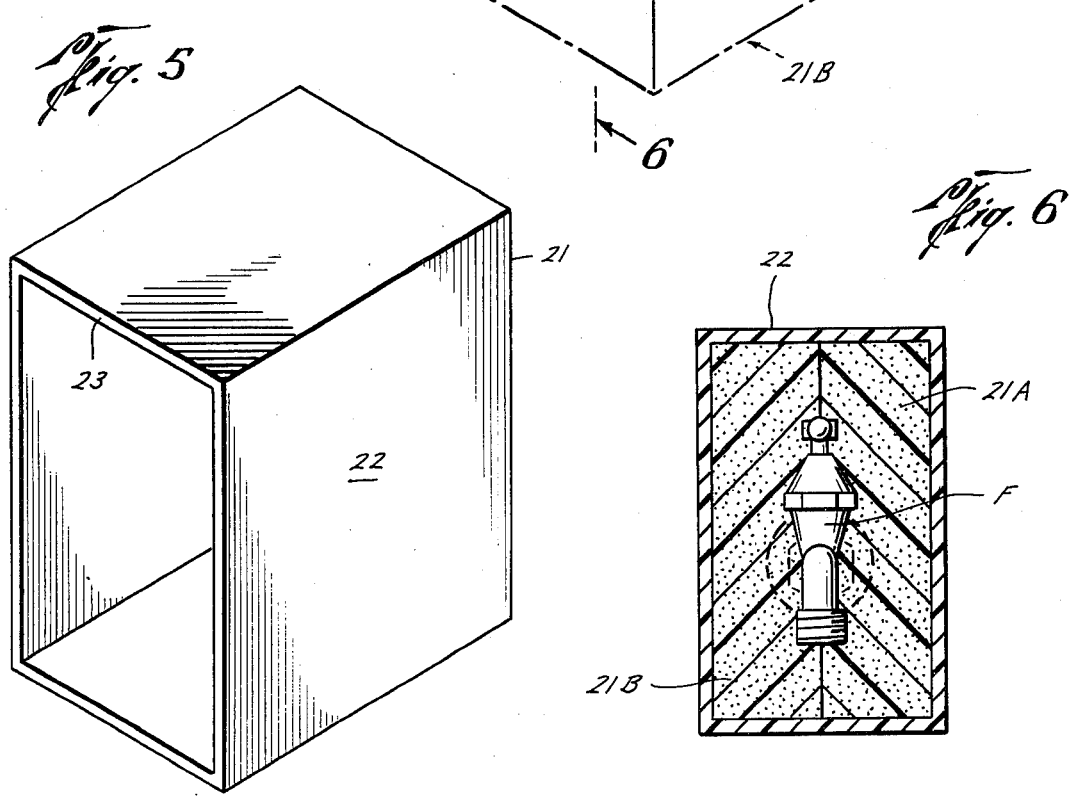

APPARATUS FOR PROTECTING A WATER FAUCET OR THE LIKE FROM FREEZING TEMPERATURES

This invention relates to apparatus for protecting water faucets or the like from freezing temperatures; and, more particularly, to improvements in apparatus of the type in which thermal insulating material is assembled about the faucet during freezing temperatures, but removed therefrom during warmer conditions.

Walker Patent No. 2,650,180 shows an apparatus of this type comprising preformed bodies of thermal insulating material having outer protective covers which are assembled about the faucet adjacent the wall from which it extends, and then secured to one another in assembled relation to form an enclosure for the faucet. Watanabe Pat. No. 2,985,552 shows another device of this type which comprises a hood or sheath of thermal insulating material which also has an outer protective cover and is adapted to fit loosely over the faucet, and a flexible extension of the hood which is wrapped around the extension of the faucet to close the open end of the hood. In both cases, the apparatus is expensive to fabricate and difficult to assemble in order to assure a substantially air-tight enclosure for the faucet.

An object of the present invention is to provide apparatus of this type which is inexpensive to manufacture and simple to assemble about the faucet; and, more particularly, in which the thermal insulating material need not be preformed but instead may be cut from commercially available stock.

Another object is to provide apparatus of the type above described which may nevertheless be used to protect different sizes and shapes of faucets.

A more particular object is to provide apparatus of this type which is reusable with different sizes and shapes of faucets.

Still a further object is to provide apparatus of this type in which the thermal insulating material does not require an outer protective wrapping to protect it from ambient moisture.

These and other objects are accomplished, in accordance with the illustrated embodiments of the invention, by apparatus which comprises a pair of bodies of foamed plastic materials having inner sides disposable on opposite sides of the faucet, and means for forcing the bodies toward one another, when so disposed, in order to cause the inner sides to be deformed into conformity with the faucet and to tightly engage one another in surrounding relation with the faucet adjacent its extension from a wall. The forcing means holds the inner sides in such tight engagement so as to maintain a substantially airtight enclosure about the faucet during freezing temperatures, but is releasable to permit removal of the bodies from the faucet during warmer conditions.

In accordance with one embodiment of the invention, the forcing means comprises a pair of relatively rigid sheets each of which is disposable against an outer side of one of the bodies, and means for drawing the sheets toward one another. Since the uncovered ends of the bodies of plastic material are exposed to weather, such material is preferably a polystyrene or other suitable foamed plastic material which does not absorb moisture.

In accordance with another embodiment of the invention, the forcing means comprises a sleeve of relatively rigid, moisture impervious material having an open end for fitting over the bodies to permit to to be moved against the wall from which the faucet extends and an opposite, closed end to protect the bodies from the weather. Since it need not be moisture proof, the plastic material of this embodiment may be a polyurethane or other suitable material which is resilient so that, upon removal of the bodies from the faucet, their inner sides return to their original shapes to permit them to be reused in protecting other sizes and shapes of faucets.

In the drawings, wherein like reference characters are used throughout to designate like parts:

FIG. 4 is a perspective view of apparatus constructed in accordance with the second described embodiment of the invention and assembled about a faucet, with one of its pair of bodies of foamed plastic material and the one side of the sleeve which fits over the bodies being shown in broken lines;

FIG. 5 is a perspective view of the sleeve of the apparatus shown in FIG. 4, as seen from its open end; and FIG. 6 is a cross-sectional view of the apparatus of FIG. 4, assembled about the faucet, as seen along broken lines 6—6 of FIG. 4.

Figure 1:
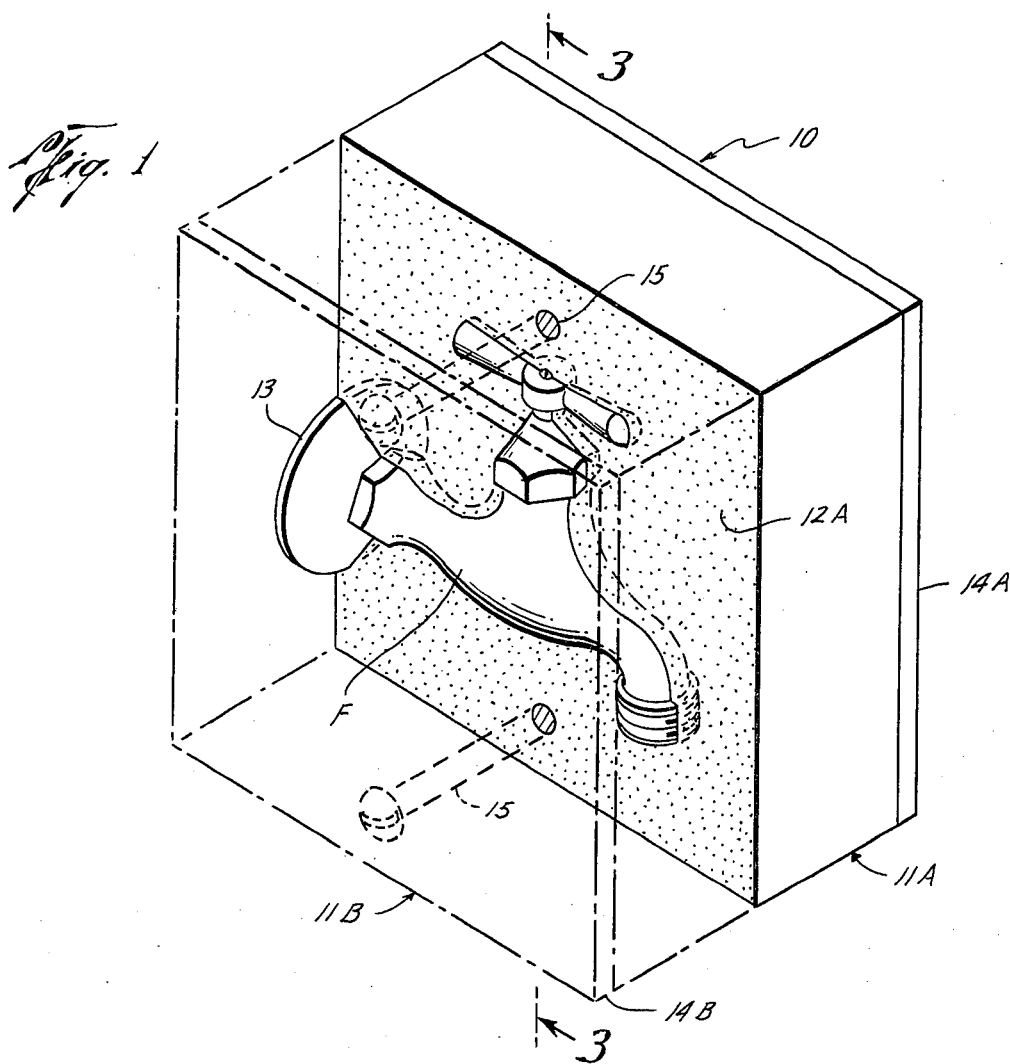
FIG. 1 is a perspective view of apparatus constructed in accordance with the first-described embodiment of the invention and assembled about a water faucet, with one of a pair of bodies of foamed plastic material and one of the compressing sheets being shown in broken lines so as to better illustrate the conformity of the inner sides of the bodies with opposite sides of the faucet.
Figure 2:
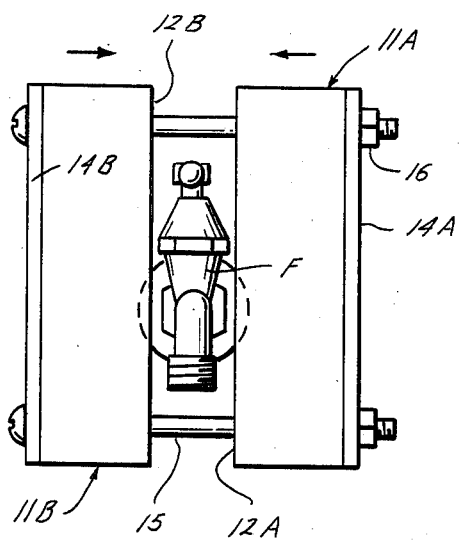
FIG. 2 is an end view of the apparatus of FIG. 1 with the inner sides of the bodies spaced apart to permit their disposal on opposite sides of the faucet during assembly about the faucet.
Figure 3:
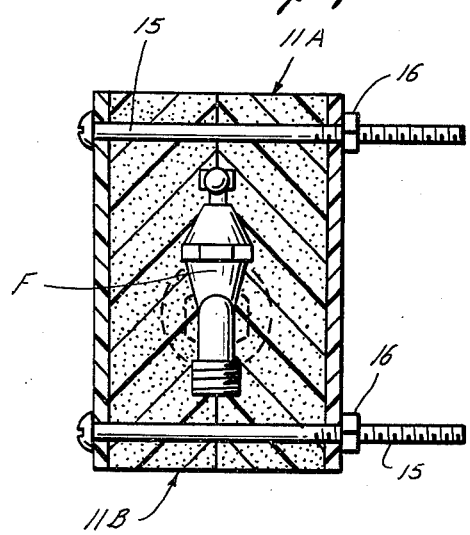
FIG. 3 is a cross-sectional view of the apparatus of FIGS. 1 and 2, as seen along broken lines 3—3 of FIG. 1, upon forcing of the bodies toward one another into assembled position about the faucet.

With reference now to the details of the above described drawings, the embodiment of the apparatus which is shown in FIGS. 1 to 3, and indicated in its entirety by reference character 10, includes a pair of bodies 11A and 11B of a foamed plastic material, which is preferably polystyrene. Such material is relatively rigid so that when cut from stock of the desired thickness, it is easy to transport, package, and then handle during assembly of the apparatus about a faucet F, which is a conventional construction having a flange 13 on its inner end for connection to the wall (not shown) from which the faucet extends.

When so cut, each body 11A and 11B is of generally rectangular shape having flat inner and outer sides, the thickness, length and height of which will, of course, depend on the size of the faucet. That is, they must be of a length and height somewhat larger than the length and height of the faucet so as to overlap therewith, when installed on opposite sides thereof, whereby their inner sides may be forced into engagement with one another in surrounding relation of the faucet. Also, of course, each of the bodies must be thicker than the thickness of half of the faucet so as to allow them to be deformed into conformity with the sides of the faucet. More particularly, the height, length, and thickness of the bodies should be such as to provide enough insulating material about all sides of the faucet F to protect it against the freezing temperatures. Thus, the exact dimensions of the bodies will depend not only on the dimensions of the faucet and the thermal insulating characteristics of the plastic material, but also on the temperatures to be protected against.

As shown, the bodies of plastic material are preferably assembled about the faucet with their inner sides lying substantially vertical, because this requires bodies of minimum thickness. However, this invention contemplates that, with thicker bodies, they may be assembled with their inner sides assembled in horizontal positions, or at angles intermediate vertical and horizontal. In this sense, then, the term "sides", as it is used with respect to the bodies and the faucet, denotes no particular horizontal or vertical orientation.

Although polystyrene is sufficiently rigid to permit it to be handled with ease, it is nevertheless deformable when force is applied thereto, and thus permits the inner sides of the bodies 11A and 11B to deform into conformity with the sides of the faucet as the bodies are forced toward one another. More particularly, and as will be best understood from a comparison of FIGS. 2 and 3, following such deformation, the surrounding portions of the inner sides of the body are caused to tightly engage one another, and thus enclose the faucet in substantially air-tight relation.

As previously described, in this first embodiment of the invention, the bodies are so forced by sheets 14A and 14B of relatively rigid material, such as wood, metal, or hard plastic, which are disposable against the outer sides of the plastic bodies 11A and 11B, and means for drawing these sheets toward one another to move the bodies into assembled positions about the faucet. As illustrated the sheets are so drawn by means of bolts 15 which extend through the sheets and the plastic bodies, and nuts 16 on the threaded ends of the bolts. Thus, as will be apparent from FIGS. 2 and 3, the heads of the ends of the bolts bear against the outer sides of sheet 14B, and the nuts 16 bear against the outer sides of sheet 14A so as to draw the sheets toward one another as the nuts are made up with the bolts.

Nuts 16 are not only useful in drawing the sheets toward one another, but due especially to at least a certain amount of spring back in the plastic bodies, in holding their inner sides in conformity with the faucet and tightly engaged with one another. Then, when it is desired to remove the apparatus from the faucet, during the warmer temperatures, it is necessary only to back off the nuts in order to permit the inner sides of the plastic bodies to be spread apart a distance sufficient to permit their removal from the faucet.

The bolts may be assembled through aligned holes in the plastic bodies and sheets as the plastic bodies are held on opposite sides of the faucet, or alternatively, the sheets, bodies, and bolts may be preassembled with the inner sides of the bodies spaced apart, as shown in FIG. 2, so as to permit the apparatus to be moved endwise onto opposite sides of the faucet.

The embodiment of the apparatus which is shown in FIGS. 4 to 6, and indicated in its entirety by reference character 20, comprises a pair of bodies 21A and 21B of foamed plastic material which may be identical in size to the bodies 11A and 11B of apparatus 10 for use in protecting a faucet F similar to that shown in FIG. 1. However, and as previously mentioned, these bodies are forced toward one another and into assembled position about the faucet by means of a sleeve 22, which may be any suitable rigid metal, wood or hard plastic which is impervious to water. Since it is thus protected from moisture, this plastic material may be a polyurethane which is a resilient, so that even though its inner sides are deformed into conformity with faucet F, when the apparatus is installed thereon, they will, upon removal of bodies 21A and 21B from the faucet, return to their original flat shapes. Consequently, the faucet may be used with faucets of other sizes and shapes, as well as with the faucets identical to faucet F shown in FIG. 4.

As also previously described, sleeve 22 has an open end 23 adapted to fit over the bodies, when disposed on opposite sides of faucet F, and a closed end 24 opposite the open end, so that, when the sleeve is fitted over the bodies, the edges of its open end 23 may be moved into a position adjacent the wall to enclose and protect the bodies against ambient moisture.

In order to force the bodies toward one another to cause the inner sides to conform to the faucet and tightly engage one another along in surrounding relation to the faucet, the width of the inside of the sleeve is somewhat less than the combined widths of the plastic bodies prior to being assembled on opposite sides of the faucet. Since the plastic material is resilient, it is also necessary that the vertical dimension of the opening in the sleeve be not substantially greater than the height of the bodies so that lateral compression can be applied to them during assembly.

In installing this apparatus, the bodies may be first moved into positions on opposite sides of the faucet, and the sleeve then slipped over the outer ends of the bodies. It may be found, however, that the better procedure is to install only the inner ends of the bodies on opposite sides of the faucet, and then, when the sleeve has been moved over a substantial portion of the outer ends of the bodies, move the bodies and sleeve inwardly together to bring the inner ends of the bodies against the wall, following which the sleeve may be moved fully over the bodies so as to cause its inner end to be moved against the wall.

Obviously, when the sleeve is fitted over the bodies, it not only forces them into the assembled position shown in FIG. 6, but also holds them in assembled position until such time that the sleeve is removed from the bodies so as to permit the bodies to be removed from opposite sides of the faucet.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for freeze protecting a water faucet which extends from a wall, comprising a pair of bodies of foamed plastic material having inner sides disposable on opposite sides of the faucet with their inner ends adjacent the wall and their outer ends beyond the outer end of the faucet, and a sleeve of relatively rigid, moisture impervious material having an open end for fitting over the bodies for forcing them toward one another, when so disposed, in order to cause their inner sides to be deformed into conformity with the faucet and tightly engaged with one another in surrounding relation to the faucet adjacent its extension from the wall and their inner ends to tightly engage with the wall from which the faucet extends, and an opposite closed end so as to enclose said bodies when said open end is moved against the wall, said sleeve holding said inner sides in such tight engagement so as to maintain a substantially air-tight enclosure about the top, bottom, sides and outer end of the faucet, but being releasable to permit removal of said bodies from said faucet.

2. Apparatus of the character defined in claim 1, wherein said plastic material is resilient.

3. Apparatus of the character defined in claim 2, wherein said plastic material is a polyurethane.

* * * * *